Aug. 19, 1969 F. G. HOHMANN ET AL 3,461,491
UNIFORMLY BLOW MOLDED CONTAINER NECK
Filed Jan. 12, 1967 3 Sheets-Sheet 1
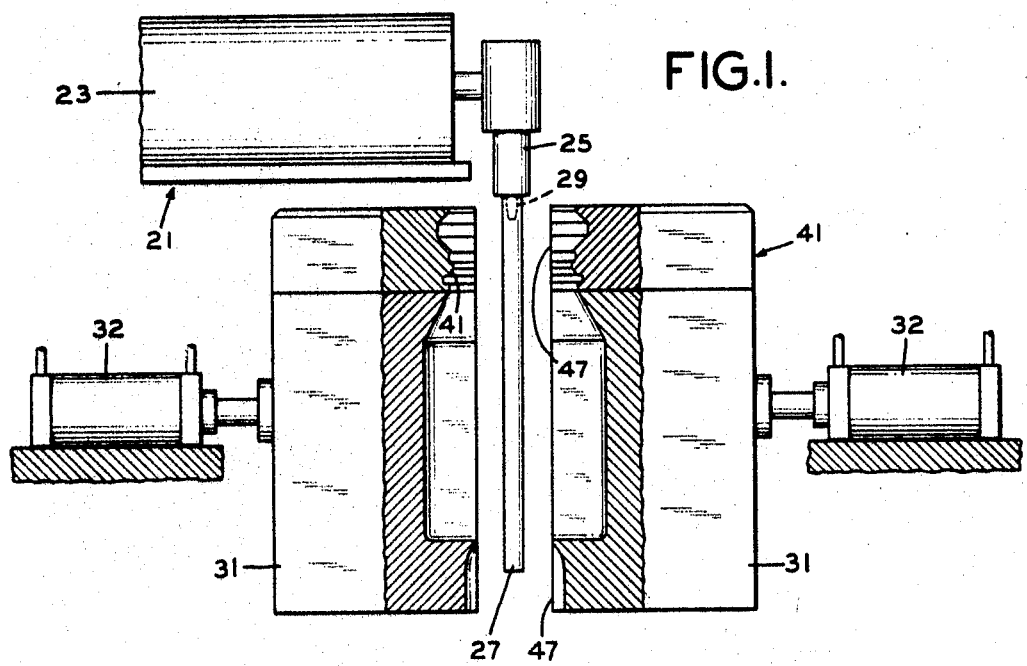
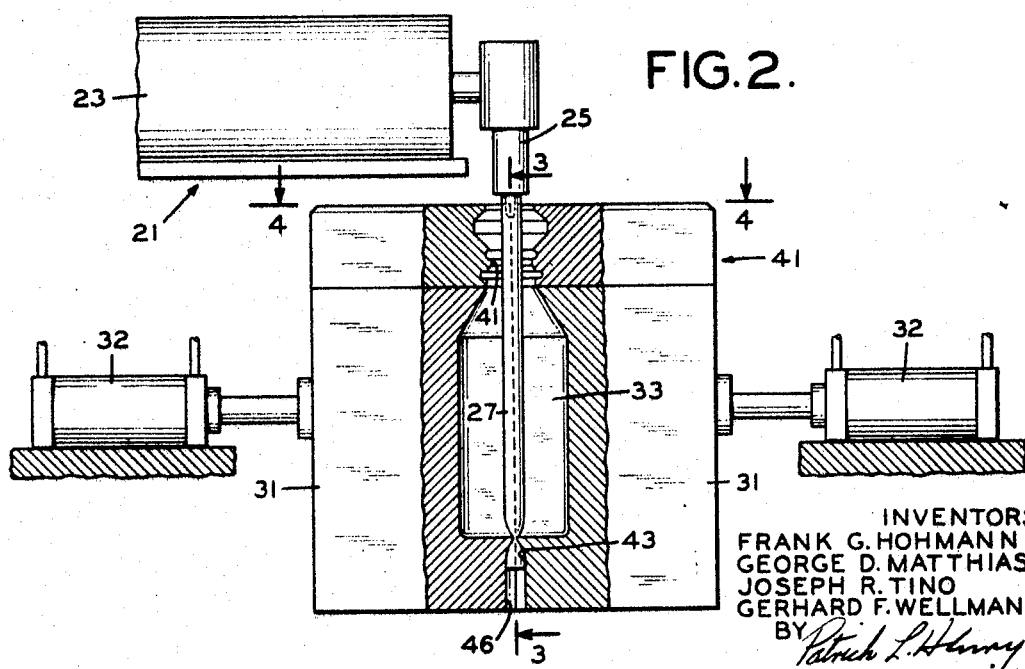
INVENTORS:
FRANK G. HOHMANN
GEORGE D. MATTHIAS
JOSEPH R. TINO
GERHARD F. WELLMANN
BY Patrick L. Henry
ATTORNEY INVENTORS:
FRANK G. HOHMANN
GEORGE D. MATTHIAS
JOSEPH R. TINO
GERHARD F. WELLMANN
BY *Patrick L. Henry*
ATTORNEY Aug. 19, 1969    F. G. HOHMANN ET AL    3,461,491
UNIFORMLY BLOW MOLDED CONTAINER NECK
Filed Jan. 12, 1967    3 Sheets-Sheet 3
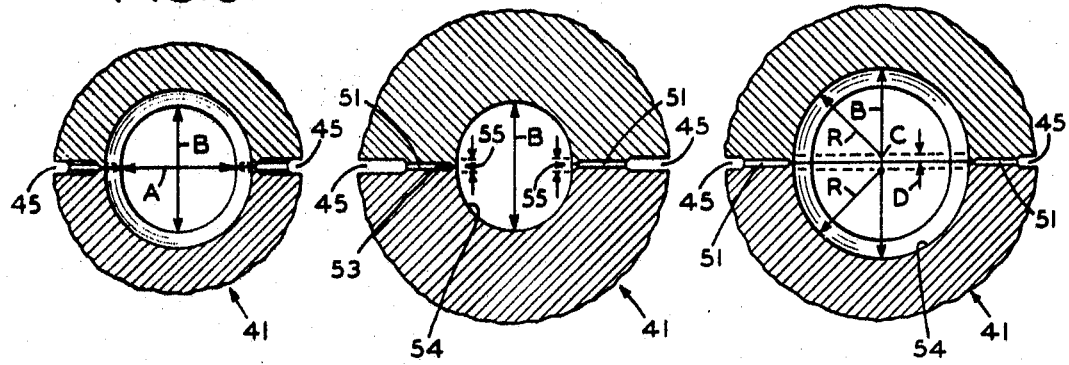
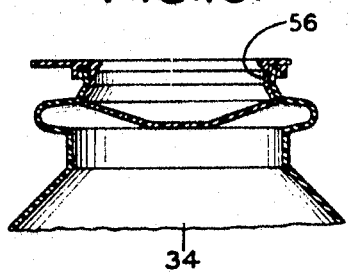
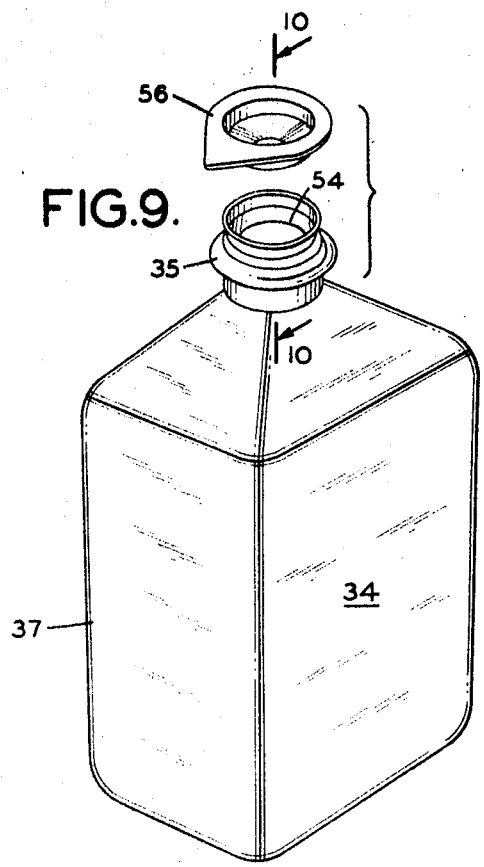
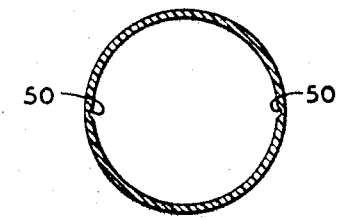
INVENTORS:
FRANK G. HOHMANN
GEORGE D. MATTHIAS
JOSEPH R. TINO
GERHARD F. WELLMANN
BY
ATTORNEY United States Patent Office 3,461,491
Patented Aug. 19, 1969

3,461,491
UNIFORMLY BLOW MOLDED CONTAINER NECK
Frank G. Hohmann, Fort Lee, George D. Matthias, Belleville, Joseph R. Tino, Clifton, and Gerhard F. Wellmann, Mountain Lakes, N.J., assignors to Allied Chemical Corporation, New York, N.Y., a corporation of New York
Filed Jan. 12, 1967, Ser. No. 608,862
Int. Cl. B29c *3/00;* C03b *9/26*
U.S. Cl. 18—5                           7 Claims

ABSTRACT OF THE DISCLOSURE

Mold cavity for making blow molded containers having substantially truly round interior neck finishes free of lumps and depressions. This is accomplished by making the neck portion 41 of the mold 33 out of round so as to compensate for uneven shrinkage; and providing a restriction 51 between the pinch-off portion of the mold 33 and the lay-flat cavity 45 so as to allow the plastic material to flow into the lay-flat cavity at a rate such as to avoid depressions or lumps on the internal surface of the neck of the container.

The present invention relates to a mold for forming blow molded articles. More particularly, the invention relates to a blow mold cavity for making containers, the necks of which are substantially truly round adjacent the top thereof.

Blow molding is a process by which containers and other hollow articles are formed from heat softened plastic material. One type of blow-molding machine extrudes a hollow tube commonly called a parison between two open female mold halves. These mold halves are then closed to pinch tight the bottom of the extruded tube. An air nozzle at the top of the tube (generally outside of the cavity) then blows air into the center of the extruded, heat softened tube so as to cause it to expand against the sides of the closed mold and conform to the shape thereof. When the plastic has sufficiently cooled and hardened to support itself, the mold halves are opened and the container is caused to drop out. The excess plastic material protruding from the areas where the extruded tube was pinched by the cavity is then cut or knocked off to provide a finished product.

In most bottle molding operations, the neck portion is formed with threads on the top outside portion thereof to receive a screw type cap. The nature of this process and the plastic used results in uneven shrinkage of the cooling material, thus resulting in a neck portion which is slightly out of round. In an industry where the cap is on the outside of the container, this variance is usually acceptable.

Certain types of containers, e.g. for milk and the like, however, are adapted to utilize a plug-type cap, for example of the type shown in U.S. Patent No. 3,244,308. In this type of container, no threads are formed on the outside of the neck but a slight under-cut or reverse taper must be formed on the inside of the neck adjacent the top of the container to provide means for firmly retaining the cap in place on the container. When forming this type of neck portion, a mandrel is not normally used to form the interior portion of the neck because of the difficulty of withdrawing the mandrel from the under-cut after the container is formed. Therefore, the top portion of the parison is merely pinched between the mold halves and blown out against the side of the mold along with the rest of the parison so that the entire container is formed by expanding the heat softened extruded parison against the sides of the mold cavities to conform it to the shape thereof. Without a mandrel to form the neck interior, the flow of plastic out of the mold cavity during the forming step is difficult to control and often results in lumps or depressions in the neck portion of the molded bottle.

It has been found in accordance with this invention, that the under-cut portion of the neck of the container adjacent the top thereof can be formed so that the interior is substantially truly round and free of lumps or depressions by making the diameter of the mold neck portions out of round and providing a restriction between the pinch-off edges thereof and the lay-flat cavity which is adapted to receive the excess pinched off material in the area of the neck. This is accomplished by making the neck portions in an elliptical configuration such that the diameter thereof along a line perpendicular to the parting line to provide a substantially truly round neck portion at least in the area of the under-cut. The lumps and depressions are eliminated by providing a restriction between the pinch-off section and the lay-flat cavity whereby the flow of plastic material out of the cavity into the lay-flat area during the closing of the mold cavities and the blowing step is controlled so that no lumps or depressions are formed in the neck interior adjacent the under-cut.

Other features of the invention will become apparent by reference to the following specification and to the drawings.

In the drawings:

FIGURE 1 is a schematic view, partially broken away, of a blow molding apparatus partly in section showing the extruded tube in place between mold halves before they are closed.

FIGURE 2 is a similar view showing the mold halves closed.

FIGURE 6 is a sectional view taken along lines 6—6 of FIGURE 5 showing both halves of the cavity.

FIGURE 7 is a sectional view taken along lines 7—7 of FIGURE 5 showing both halves of the cavity.

FIGURE 8 is a sectional view taken along lines 8—8 of FIGURE 5 showing both halves of the cavity.

FIGURE 9 is a perspective view of a typical blow molded bottle formed in accordance with the present invention, and a plug type cap adapted to be inserted in the neck thereof.

FIGURE 10 is a section taken along lines 10—10 of FIGURE 9 showing the configuration of the bottle neck portion and the cap in place thereof.

FIGURE 11 is a cross-section of a neck formed in accordance with the prior art showing the lumps which may form on the interior of the neck.

FIGURE 12 is a cross-section of a neck formed in accordance with the prior art showing the depressions which may form on the interior of the neck.

Figure 3:
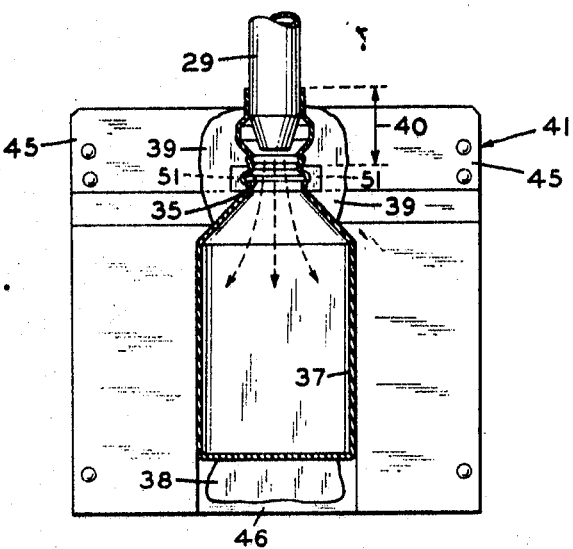
FIGURE 3 is a section taken along lines 3—3 of FIGURE 2 showing the container after it is blown against the side of the cavity and how the excess material is squeezed into the lay-flat sections of the mold.
Figure 4:
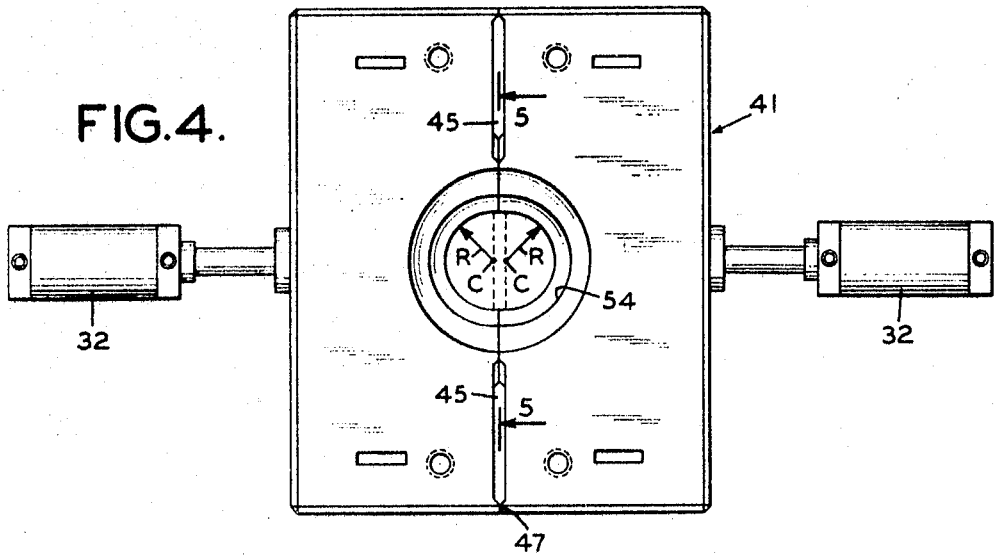
FIGURE 4 is a plan view of the mold cavity taken on lines 4—4 of FIGURE 2.
Figure 5:
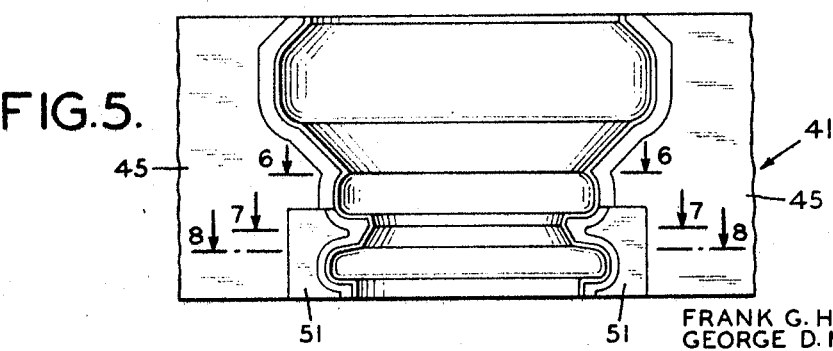
FIGURE 5 is an elevation of the neck insert taken along lines 5—5 of FIGURE 4.

Referring to FIGURE 1 of the drawings, an extrusion type blow molding apparatus shown generally by reference numeral 21 comprises an extruder 23 adapted to supply plasticized material through a die head 25 to form a hollow parison 27. The die 25 includes a nozzle 29 projecting downwardly therefrom and communicating with a source of air pressure. The parison 27 is extruded between two complementary mold sections 31 which subsequently close around the parison 27 and pinch the bottom end and top thereof. When the mold sections 31 are closed around the parison by action of rams 32, they serve as a mold cavity 33. The parison 27, by action of the pressurized air through nozzle 29 is expanded into conformity with the shape of the mold cavity 33 formed by the two sections 31 to form a container 34 having a neck portion 35 and a body portion 37. After the container has been formed and cooled, the mold sections are opened and the container is stripped away from the die 25 by a mechanical stripper (not shown) which serves to sever the formed container from die 25. A subsequent trimming operation removes the excess material or flash 38, 39, 40 from the formed bottle to provide a finished product.

The particular aspect of the operation which relates to the present invention resides in the configuration and design of the neck portion 41 of the mold sections 31. When the mold sections 31 come together, they pinch the parison 27 between them at the bottom 43 and in the area of the neck portion 35. This pinching action on the parison serves to close off the bottom thereof and locate the top with respect to the neck mold. Cavities or lay-flat areas 45, 46 adjacent the neck portion and bottom portions of the mold sections act as accumulators to store the flash 38, 39, which is outside of the mold cavity. These lay-flat areas 45, 46 are located along the junction 47 between the mold sections 31. This junction is more commonly referred to as the parting line.

The pinching action of the mold sections and the blowing of the bottle often causes lumps or depressions in the interior at the parting line. If the restriction on the flow of material into the lay-flat area 45 is too great, not all of the material will flow into this area and the excess will manifest itself in the form of lumps 49 visible as protrusions into the interior of the container in the area of the parting line, thus causing the container to be out of round in the area where material has been pinched off. On the other hand, if no restriction is provided, the force of the pressurized air on the interior walls of the bottle will tend to force it into the lay-flat area thus causig a depression 50 or weak spot in the wall of the container. To counteract these problems, a restriction 51 has been provided between the lay-flat area 45 adjacent the pinch-off land 53. This restriction is in the form of a flat surface designed so that it allows the excess plastic to flow smoothly into the mold during the pinch-off step to prevent lumps, but prevents the blowing of material into the lay-flat area during the blowing step, thereby preventing sinks.

When molding items of the type disclosed in this type of operation it has been found that the portions of the container in the areas where the flash 39 is formed along the parting lines are subject to a different degree of shrinkage than those areas remote from the parting line 47; and that the neck portion of the finished container is out-of-round when formed from a mold having a substantially truly round neck portion. To compensate for this, the neck mold of the present invention is formed out-of-round so as to produce a substantially truly round container neck.

Specifically, that portion of the neck mold which must produce a truly round container neck portion is made in the general shape of an ellipse having its minor axis A along the parting line and its major axis B perpendicular to the minor axis when viewed from the top. The shape of this part of each mold neck portion 41 of each mold section is in the form of a semi-circle 54 having a radius R substantially equal to one-half the length of the minor axis A and formed about a center point C on the major axis B offset from the minor axis A a distance D equal to about .435% to .57% of the length of the minor axis A. This semicircle terminates in substantially rectilinear portions 55 located adjacent the minor axis A and extending along the circumference of the said neck portion a distance approximately equal to the distance D which the center point C is offset from the minor axis. It has been found that when at least a portion of the neck insert of the mold is of this configuration, the interior of the neck of the container corresponding thereto will be substantially truly round and readily adaptable to accommodate a plug type cap 56 in sealing relationship thereto.

While an exemplary embodiment of the invention has been described, the true scope of the invention is to be determined from the following claims:

What is claimed is:

1. A mold adapted to form a molded article from a parison, said mold comprising:
   a pair of mold sections adapted to be moved radially inwardly toward said parison from opposite sides thereof into engagement with each other and at least a portion of the parison;
   said mold sections having a portion adapted to form an opening in the article;
   at least a segment of said portion having an elliptical configuration such that the minor axis thereof lies along the parting line between the mold sections and the major axis thereof is perpendicular to the parting line axis.

2. The device of claim 1 wherein each of the said portions is formed in part as a semicircle having a radius equal to about one-half of the length of said minor axis and formed about a center point on said major axis but offset from the minor axis a distance equal to about .435% to .57% of the length of the minor axis.

3. The device of claim 2 wherein the semicircular portions terminate in rectilinear portions extending along the circumference of said portion a distance approximately equal to the offset of said center point from the minor axis.

4. A mold adapted to form from a parison a plastic container having a hollow body and a substantially circular neck portion adapted to receive a closure, said mold comprising:
   a pair of mold sections adapted to be moved radially inwardly toward said parison from opposite sides thereof into engagement with each other and at least a portion of the parison;
   said mold having a body portion and a neck portion adapted to form the body and neck portions of the container;
   at least a segment of said mold neck portion having an elliptical configuration such that the minor axis thereof lies along the parting line between the mold sections and the major axis thereof is perpendicular to the parting line axis.

5. The device of claim 4 wherein the neck portion of each cavity is formed in part as a semicircle having a radius equal to about one-half the length of said minor axis and formed about a center point on said major axis but offset from the minor axis a distance equal to about .435% to .57% of the length of the minor axis.

6. The device of claim 5 wherein the semicircular portions terminate in rectilinear portions extending along the circumference of said portion a distance approximately equal to the offset of said center point from the minor axis.

7. A blow molding apparatus for forming a plastic container having a hollow body and a substantially circular neck portion adapted to receive a closure, said apparatus including means for forming an elongated parison; wherein the improvement comprises:
   a mold comprising a pair of mold sections adapted to be moved radially inwardly toward said parison from opposite sides thereof into engagement with each other and at least a portion of the parison;
   said mold having a body portion and a neck portion adapted to form the body neck portions of the container;
   at least a segment of said mold neck portion having an elliptical configuration such that the minor axis thereof lies along the parting line between the mold sections and the major axis thereof is perpendicular to the parting line axis;
   the length of the minor axis being less than the desired diameter of the corresponding neck portion of the container to be formed and the length of the major axis being greater than the diameter of the corresponding neck portion of the container to be formed; each of the mold section neck portions being formed as a semicircle having a radius substantially equal to one-half the length of said minor axis and formed about a center point on said major axis but offset from the minor axis a distance equal to about .435% to .57% of the length of the minor axis;

said semicircular portions terminating in rectilinear portions adjacent the minor axis and extending along the circumference of the said neck portion a distance approximately equal to the offset of said center point from the minor axis.

References Cited

UNITED STATES PATENTS

| | | |
|---|---|---|
| 3,205,287 | 9/1965 | Di Settemrrini. |
| 3,271,489 | 9/1966 | Fogelberg et al. |
| 3,278,664 | 10/1966 | Langecker. |
| 3,309,443 | 3/1967 | Scott et al. |
| 3,359,602 | 12/1967 | Bailey. |
| 3,390,425 | 7/1968 | Sheptak. |

WILBUR L. McBAY, Primary Examiner

U.S. Cl. X.R.

18—35